United States Patent [19]

Vetanovetz et al.

[11] Patent Number: 5,171,349
[45] Date of Patent: Dec. 15, 1992

[54] SOLUBILITY COMPOUND FERTILIZER COMPOSITIONS

[76] Inventors: Richard P. Vetanovetz, 435 Beechwood St., Emmaus, Pa. 18049; Robert Peters, 2833 Pennsylvania St., Allentown, Pa. 18104

[21] Appl. No.: 690,099

[22] Filed: Apr. 23, 1991

Related U.S. Application Data

[63] Continuation-in-part of Ser. No. 648,644, Jan. 31, 1991, abandoned.

[51] Int. Cl.$^5$ .............................................. C05C 9/00
[52] U.S. Cl. .......................................... 71/29; 71/30; 71/64.1
[58] Field of Search .................. 71/29, 65, 30, 64.08, 71/64.1

[56] References Cited

U.S. PATENT DOCUMENTS 4,013,446  3/1977  Beresky et al. ..................... 71/29 X
4,507,139  3/1985  Sullivan et al. ..................... 71/29 X

FOREIGN PATENT DOCUMENTS 2072644A  10/1981  United Kingdom .

OTHER PUBLICATIONS

Chemical Abstracts, vol. 93, 6001, Nr. 11, 1980, p. 622, 93:113193d "Solubilizing phosphate rocks using urea", one page.

*Primary Examiner*—Ferris Lander
*Attorney, Agent, or Firm*—Caesar, Rivise, Bernstein, Cohen, & Pokotilow, Ltd.

[57] ABSTRACT

Solid compound fertilizers for dissolving into stock solutions advantageously employing urea phosphate as a phosphorous source. The use of urea phosphate makes it possible to have calcium present as well as nonchelated trace metals without precipitation.

13 Claims, No Drawings

SOLUBILITY COMPOUND FERTILIZER COMPOSITIONS

This is a continuation-in-part of U.S. Ser. No. 07/648,644 filed Jan. 31, 1991, now abandoned.

BACKGROUND OF THE INVENTION

1. Field of the Invention

This invention concerns improved solid fertilizer compositions and in particular solid fertilizer compositions useful for preparing aqueous fertilizer solutions for precision plant nutrition.

2. Prior Art

In greenhouses, nurseries and other intensive horticulture environments, best results are attained when macro- and micronutrients are carefully delivered to the growing plants. Many growers choose to utilize compound high analysis water-soluble fertilizers. Typically, these fertilizers are marketed as solids which are dissolved to prepare concentrated stock solutions which are then diluted into irrigation water by means of proportioners or injection devices.

The Grace Sierra Horticultural Products Company markets a wide range of water-soluble solid compound fertilizer formulations under the Peters Professional ® trademark. These formulations are designed to dissolve quickly and completely with no precipitation. It is also desired that a fertilizer formulation have good long-term stability as a stock solution so as not to form precipitates which can clog proportioners and irrigation lines. This has led to a limitation with water-soluble fertilizer formulation available heretofore. Calcium is an important nutrient which is called for in many plant nutrition formulations, but calcium salts cannot be used together with the conventional phosphorous sources—monoammonium phosphate and diammonium phosphate—as the pHs which these phosphate sources provide are too high (not acidic enough) to give adequate solubility to the calcium ions and thus give rise to precipitation of the calcium salts in the stock solution and in the proportioners.

Potassium phosphate or sodium phosphate can be used as soluble phosphorous sources but these are either expensive or not conducive to plant growth. Phosphoric acid can be used but is a liquid and hazardous to handle. Therefore, a grower wishing to fertilize with both calcium and phosphorous, without resorting to the use of an alkali metal phosphate or liquid phosphorous acid, will need to inject these two elements separately.

Secondly, and similarly, the use of chelated trace nutrients (micronutrients) has been widely postulated in order to keep these trace nutrients in solution in stock solutions which also contain the monoammonium and diammonium phosphates. If nonchelated micronutrients (such as simple nitrates or sulfates) are employed with the conventional phosphorous sources, the micronutrients tend to precipitate from solution. Again, these chelated micronutrients increase the cost of the fertilizer formulations.

The present invention employs urea phosphate in water-soluble solid fertilizer formulations. Urea phosphate is a known material. The text, *Urea and Urea Phosphate Fertilizers* by Clifford W. Fowler (Noyes Data Corporation, Park Ridge, N.J., 1976) at page 23, shows a process for preparing this material and suggests that it may be used as a fertilizer. Similarly, U.S. Pat. No. 4,456,463 discloses the use of urea-phosphoric acid reaction products as ammonia-stabilized liquid components of fertilizers. *Chemical Abstracts* 106(3)101311q shows a liquid component for use in fertilizers which contains a urea phosphate polycondensation product. *Chemical Abstracts* 102(9)77486v also shows this. Other references of interest include *Chemical Abstracts* 101(23)209498s which concerns the biological fate of urea/phosphate fertilizers; *Chemical Abstracts* 101(21)190398k which discusses the use of urea phosphate fertilizers; *Chemical Abstracts* 88(19)135558a which describes the reaction of that phosphoric acid reacts with urea and with calcium salts; and *Chemical Abstracts* 86(11)70783g which deals with the development of liquid multicomponent fertilizers based on potassium and ammonium nitrates and diphosphates, urea, water and trace elements.

STATEMENT OF THE INVENTION

An improved solid fertilizer which dissolves completely in water to give a phosphorous-containing stock solution has now been found. This fertilizer is characterized by being a solid, by having urea phosphate as the principal phosphorous source, by containing calcium and/or magnesium and/or nonchelated micronutrient trace metals such as iron, manganese, copper, boron, zinc and molybdenum, and by dissolving completely in water without precipitate formation initially or upon prolonged standing, such as for 24 hours or longer.

In one embodiment, this invention provides a calcium-containing solid complex fertilizer which dissolves completely in water to give a water-based precipitate-free stable aqueous stock solution, this solid fertilizer containing solid urea phosphate as the principal phosphorous source and calcium nitrate.

In another embodiment, this invention provides a trace metal-containing solid complex fertilizer which dissolves completely in water to give a water-based precipitate free stable aqueous stock solution, this solid fertilizer containing solid urea phosphate as the principal phosphorous source and nonchelated micronutrient trace metal nitrate or sulfate salts such as at least one of iron sulfate or nitrate, manganese sulfate or nitrate, copper sulfate or nitrate, and zinc sulfate or nitrate. This material may contain magnesium sulfate or nitrate, as well. It also may contain calcium nitrate.

In addition, this invention provides a method for preparing a stable water-based phosphorous-containing and calcium-containing fertilizer aqueous stock solution. This method involves Obtaining a solid compound fertilizer admixture of urea phosphate as a primary phosphorous component and calcium nitrate, and Mixing this admixture with water at a ratio predetermined to yield to a concentration of the admixture of 2 to 40% by weight and allowing the admixture to dissolve completely.

This same general process can be used to prepare a nonchelated trace metal (e.g. $FeSO_4$, etc.)-containing phosphorous-containing fertilizer aqueous stock solution, which also constitutes an aspect of this invention.

The inclusion of urea phosphate in a dry blended mixture of nutrient sources which include calcium, and/or magnesium with or without trace metals such as iron and the like in nonchelated forms such as nitrates and/or sulfates offers several advantages. For one, the urea phosphate establishes a low pH condition when the blended mixture is added to water to make a concentrated stock solution. A stock solution pH in the range of 0 to 2 may be achieved. This low solution pH maintains solubility and clarity of the concentrated stock solution. Urea phosphate, by the effect it has on solution pH, prevents the formation of calcium phosphate, magnesium phosphate and iron phosphate, which are not soluble. Similarly, the low pH helps prevent calcium from precipitating in the presence of sulfate ions which may be present. Therefore, when urea phosphate is used as a primary phosphorous source, it will make possible the inclusion of phosphorous and a metal such as calcium, magnesium or iron in one compound fertilizer, without the use of chelates or the disadvantage of a precipitate forming. This allows the end user to prepare and apply a complete nutrient solution using one stock solution and utilizing one injector. It also makes possible the inclusion of nonchelated trace nutrients into phosphorous-containing nutrient solutions without precipitation. It also allows the fertilizer solution to have an increased acidifying effect on the growing medium if needed. In summary, the advantages of using urea phosphate as a primary phosphate source in a solid compound fertilizer are:

a. The ability to purchase, prepare and apply a complete nutrient solution with one stock solution and one proportioner.
b. The ability to use nonchelated micronutrient trace elements without reduction in solubility in the stock solution as is observed using conventional dry phosphorus sources.
c. The ability to formulate acidic fertilizers that are sold as dry solids and thus are less hazardous to the end user than liquid phosphoric acid-based materials.

DETAILED DESCRIPTION OF THE INVENTION

The fertilizer compositions of this invention are dry solid materials. This is defined to mean that they are particulate flowing solids having a water content of less than about 10% by weight total composition.

The fertilizer compositions of this invention contain urea phosphate

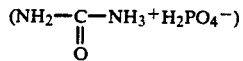

as a dry particulate solid. This amount of urea phosphate will vary depending upon the nitrogen and phosphorous analysis desired for the formulated composition. Typically, the urea phosphate is used in place of monoammonium phosphate or diammonium phosphate. Since urea phosphate contributes nitrogen as well as phosphorous in a precise stoichiometric ratio to the dry fertilizer mix, it may be necessary to add additional phosphorous sources or nitrates or urea as additional nitrogen sources to alter the ratio provided by urea phosphate alone. A solid product of the invention will contain at least about 5% by weight (total solids) of urea phosphate which by itself will contribute about 2.5% w phosphorous, (calculated as $P_2O_5$) and about 1% w nitrogen as N. The solid product can contain up to about 95% by weight of urea phosphate which would by itself contribute about 43% w phosphorous as $P_2O_5$ and about 17% w nitrogen as N. Higher P or N assays can be achieved by the addition of phosphorus sources or various nitrogen sources, such as urea or ammonium nitrate. The range of materials falling within the scope of this invention have phosphorous contents (as % w $P_2O_5$) of from about 2.5% to 44%, nitrogen contents (as % w N) of from 1% to 40% and potassium contents (as % w $K_2O$) of from 0% to 35%. Within these formulation ranges and parameters, it is desirable for the urea phosphate to be the primary or principal source of phosphorous in the present solid fertilizers. By "primary" or "principal" source is meant that urea phosphate contributes at least about 50%, and preferably at least about 95% and especially essentially 100% of the phosphorous present in these products. In cases where urea phosphate is not the sole phosphorus source, other phosphates such as potassium phosphate and ammonium phosphate can make up the balance.

In addition to the phosphorous and nitrogen and optional potassium, the materials of this invention include calcium and/or at least one metal selected from magnesium, iron, manganese, copper, boron, zinc and molybdenum. Ranges of concentration for these materials are as follows:

| Nutrient | Concentration Range as Elemental Nutrient in Final Dry Product, % |
|---|---|
| Ca | 0–15 |
| Mg | 0–5.0 |
| Fe | 0–1.0 |
| Mn | 0–1.0 |
| Cu | 0–0.5 |
| B | 0–0.5 |
| Zn | 0–1.0 |
| Mo | 0–0.2 |

Importantly, these materials are not provided as chelates, such as EDTA chelates or the like, but rather as simple salts, especially nitrates or sulfates. In the case of boron, it may be supplied as boric acid. Molybdenum may be provided as an alkali metal or ammonium molybdate. Magnesium, although often present in higher concentration than typically associated with "trace metals" can be present as magnesium sulfate or nitrate. This means that the following representative materials may be used in the products with minimal concern about precipitation or the like: calcium nitrate, magnesium sulfate, magnesium nitrate, ferrous sulfate, ferrous nitrate, manganese sulfate, manganese nitrate, cupric sulfate, cupric nitrate, boric acid, zinc sulfate, zinc nitrate, sodium molybdate, ammonium molybdate and the like. In addition, the solid products can contain additional materials such as cofactors if desired.

These materials are mixed as solids, often with minor amounts of water as hydration and the like being present to allow a homogenous product to be formed. The resulting products are dry solids as that term has been defined herein. They can be sold in bulk or they can be premeasured into units suitable for forming a standard volume of stock solution. In either case, it is often of advantage to distribute the materials in water-resistant packaging to minimize caking and lumping. Similarly, it my be of advantage to include soluble inerts which are dyes, or which promote dispersion, prevent caking, or the like.

The solid products of this invention are made up into stock solutions by dissolving in water. This should be carried out in clean equipment usually with some agitation. Commonly, the stock solution contains from about 0.5 to about 5 lbs/gallon of dissolved solid (that is, from about 2% to about 40% by weight of dissolved solid). Preferably, the stock solution contains from about 5% to about 35% by weight of dissolved solid. This stock solution material is diluted by a factor of from 10 to 200 for application to the plants. This gives final concentrations which, for nitrogen, range from about 25 ppm up to about 450 ppm, with the other nutrients scaled accordingly.

The materials of this invention will be further described with reference to the following examples. These are provided to illustrate the practice of the invention and not to limit its scope which is defined by the appended claims.

EXAMPLES

Eight pairs of typical stock solutions were prepared using various combinations of nutrient sources, and the results differed depending on the source of phosphate. The nutrient sources included materials which are commonly used in the manufacture of water-soluble fertilizers. The most widely used source of phosphorous is monoammonium phosphate (MAP) which was compared with urea phosphate (UP) to determine differences in their effects on maintaining the solubility of all components of various compound fertilizer mixtures. In each pair, one was based on UP and the other on MAP. Some precipitates occurred in the MAP-based materials within the first 24 hours and after 30 days, the data in Table 1 were assembled.

Conclusion

These results show that the use of monoammonium phosphate (MAP) in mixtures with calcium nitrate, magnesium nitrate, ferrous sulfate, manganese sulfate, copper sulfate and zinc sulfate does not maintain the solubility of these components in solution. This is in contrast to the use of urea phosphate (UP) which does maintain the solubility of these in solution consisting of these water soluble nutrient sources. These data show that the use of UP will permit calcium nitrate, magnesium nitrate and/or metal sulfates to be present in clear, concentrated stock solutions. This is a result that MAP, as a phosphorus source, is incapable of providing.

TABLE 1

EFFECT OF UP ON ELIMINATING PRECIPITATION AS COMPARED TO MAP WHEN MIXED WITH $Ca(NO_3)_2$, $Mg(NO_3)_2$ AND/OR METAL SULFATES

| | Precipitate Occurred | No Precipitate Occurred |
|---|---|---|
| A. | 1 gr of MAP + 100 gr of calcium nitrate/liter | 1 gr of UP + 100 gr of calcium nitrate/liter* |
| B. | 10 gr of MAP + 10 gr of calcium nitrate/liter | 10 gr of UP + 10 gr of calcium nitrate/liter |
| C. | 100 gr of MAP + 100 gr of calcium nitrate/liter | 100 gr of UP + 100 gr of calcium nitrate/liter |
| D. | 10 gr of MAP + 10 gr of ferrous sulfate/liter | 10 gr of UP + 10 gr of ferrous sulfate/liter |
| E. | 100 gr of MAP + 100 gr of ferrous sulfate/liter | 100 gr of UP + 100 gr of ferrous sulfate/liter |
| F. | 150 gr of MAP + 150 gr of calcium nitrate + 150 gr of magnesium nitrate/liter | 150 gr of UP + 150 gr of calcium nitrate + 150 gr of magnesium nitrate/liter |
| G. | 100 gr of MAP + 100 gr of ferrous sulfate + 30 gr of manganese sulfate + 10 gr of copper sulfate + 40 gr of zinc sulfate/liter | 100 gr of UP + 100 gr of ferrous sulfate + 30 gr of manganese sulfate + 10 gr of copper sulfate + 40 gr of zinc sulfate/liter |
| H. | 50 gr of MAP + 95 gr of calcium nitrate + 1.0 gr of ferrous sulfate + 0.5 gr of manganese sulfate + 0.25 gr of copper sulfate + 0.5 gr | 50 gr of UP + 95 gr of calcium nitrate + 1.0 gr of ferrous sulfate + 0.5 gr of manganese sulfate + 0.25 gr of copper sulfate + |

TABLE 1-continued

EFFECT OF UP ON ELIMINATING PRECIPITATION AS COMPARED TO MAP WHEN MIXED WITH $Ca(NO_3)_2$, $Mg(NO_3)_2$ AND/OR METAL SULFATES

| Precipitate Occurred | No Precipitate Occurred |
|---|---|
| of zinc sulfate/liter | 0.5 gr of zinc sulfate/liter |

*One gram of UP was added to $Ca(NO_3)_2$ where $Ca(NO_3)_2$ was added at 100, 200, 300, 400, 500, 600, 700, 800, 900 and 1000 grams per liter of solution and no precipitate occurred in any of the solutions.

These results show that one can provide solid compound fertilizers which can be successfully formed into stable stock solutions having weight compositions as follows:

| | | Preferably |
|---|---|---|
| A. Calcium/phosphorous compound fertilizer | | |
| Calcium Nitrate | 0.1 to 99% | 5 to 95% |
| Urea Phosphate | 0.1 to 99% | 5 to 95% |
| Other Fertilizer Materials | 0 to 75% | 0 to 75% |
| B. Calcium/phosphorous/micronutrient compound fertilizer | | |
| Calcium Nitrate | 1 to 99% | 5 to 94% |
| Urea Phosphate | 1 to 99% | 5 to 94% |
| Trace Metal Sulfates and Nitrates including $FeSO_4$ $MnSO_4$ $ZnSO_4$ $CuSO_4$ | 0.1 to 50% | 1 to 40% especially 2 to 40% |
| Other Fertilizer Materials including $Mg(NO_3)_2$ and $MgSO_4$ | 0 to 75% | 0 to 75% |
| C. Phosphorous/micronutrient compound fertilizer | | |
| Urea Phosphate | 1 to 99% | 5 to 98% |
| Trace Metal Sulfates and Nitrates including $FeSO_4$ $MnSO_4$ $ZnSO_4$ $CuSO_4$ | 0.1 to 50% | 1 to 40% |
| Other Fertilizer Materials including $Mg(NO_3)_2$ and $MgSO_4$ | 0 to 75% | 0 to 75% |

What is claimed is:

1. A precipitate free concentrated aqueous stock solution formed from a dry solid fertilizer mixture and containing from about 2% to 40% by weight of dissolved solid fertilizer, said stock solution containing phosphorous and calcium, said stock solution being prepared by bringing together said dry solid fertilizer mixture and water to make up a concentrated stock solution, said dry solid fertilizer mixture comprising 5% to 95% by weight of dry urea phosphate as the principal phosphorous source and 5% to 95% by weight of dry calcium nitrate to contribute a desired amount of phosphorous and calcium for fertilization purposes.

2. The concentrated stock solution of claim 1 additionally comprising at least one nonchelated trace metal salt selected from the group consisting of iron, magnesium manganese, copper and zinc sulfates, chlorides and nitrates.

3. The concentrated stock solution of claim 1 wherein the nonchelated trace metal salt is present in an amount up to 50% by weight of the total fertilizer.

4. The concentrated stock solution of claim 1 additionally comprising a nonchelated magnesium salt selected from the group consisting of magnesium sulfate and magnesium nitrate and chloride.

5. The concentrated stock solution of claim 4 wherein the nonchelated magnesium salt is present in an amount up to 50% by weight of the total complex fertilizer.

6. The concentrated stock solution of claim 1 comprising 5 to 94% by weight of urea phosphate, 5 to 94% by weight of calcium nitrate, and 0.1 to 50% by weight of nonchelated micronutrient trace metal salt.

7. The concentrated stock solution of claim 6 wherein the nonchelated micronutrient trace metal salt comprises ferrous sulfate or nitrate.

8. The concentrated stock solution of claim 6 wherein the nonchelated micronutrient trace metal salt comprises copper sulfate or nitrate.

9. The concentrated stock solution of claim 6 wherein the nonchelated micronutrient trace metal salt comprises manganese sulfate or nitrate.

10. The concentrated stock solution of claim 6 wherein the nonchelated micronutrient trace metal salt comprises zinc sulfate or nitrate.

11. The concentrated stock solution of claim 6 additionally comprising magnesium sulfate or nitrate.

12. A precipitate free concentrated aqueous stock solution formed from a dry solid fertilizer mixture and containing from about 2% to 40% by weight of dissolved solid fertilizer, said stock solution containing phosphorous and a micronutrient trace metal salt, said stock solution being prepared by bringing together said dry solid fertilizer mixture and water to make up a concentrated solution, said dry solid fertilizer mixture comprising 5% to 95% by weight of dry urea phosphate as the principal phosphorous source and 5% to 95% by weight of a micronutrient trace metal salt selected from the group consisting of calcium, iron, magnesium, manganese, boron and molybdenum; and copper and zinc sulfates, chlorides and nitrates.

13. The concentrated stock solution of claim 12 wherein said calcium is calcium nitrate.

* * * * *